United States Patent [19]
Seabury, Jr.

[11] 3,850,035
[45] Nov. 26, 1974

[54] LOAD MEASURING APPARATUS

[75] Inventor: Richard W. Seabury, Jr., Towaco, N.J.

[73] Assignee: R F L Industries, Inc., Boonton, N.J.

[22] Filed: Aug. 17, 1973

[21] Appl. No.: 389,232

[52] U.S. Cl. ..................... 73/143, 338/47, 338/158
[51] Int. Cl. .............................................. G01l 5/10
[58] Field of Search .......... 73/136 A, 136 B, 136 C, 73/139, 143; 338/13, 47, 156, 157, 165; 323/79, 94 R

[56] References Cited
UNITED STATES PATENTS

| | | | |
|---|---|---|---|
| 1,212,751 | 1/1917 | Everett | 73/136 B |
| 2,210,759 | 8/1940 | Hansen | 73/143 |
| 3,129,300 | 4/1964 | Moyles | 73/136 B X |
| 3,384,850 | 5/1968 | Cameron et al. | 338/158 |

*Primary Examiner*—Charles A. Ruehl
*Attorney, Agent, or Firm*—Rudolph J. Jurick

[57] ABSTRACT

Apparatus providing a direct measurement of the pull applied to the anchor line of a boat, which apparatus comprises a tension to electrical transducer built into the form of a cleat and an electrical instrument responsive to the output of the transducer, said instrument having a scale calibrated in pounds anchor pull.

5 Claims, 14 Drawing Figures

PATENTED NOV 26 1974 3,850,035

LOAD MEASURING APPARATUS

BACKGROUND OF THE INVENTION

Manufacturers of anchors publish literature giving recommended anchor sizes to boat lengths, as well as figures for the holding power of various types of anchors in broad classifications of bottom materials, such as soft mud to hard sand, heavy weed to kelp, etc. Manufacturers of shackles, chains and rope also publish figures giving the strength of such items in various sizes. It is, therefore, possible for a boat owner to purchase and make up the best combination of ground tackle after considering the maximum horizontal pull and the minimum vertical pull likely to be applied to an anchor by waves, currents and wind velocity.

Detail charts also are available giving a general composition of the sea bottom at specific off-shore areas, but this can vary drastically within several boat lengths. Having selected a desired anchorage spot, the boat captain drops the anchor, and estimating the direction the anchor must hold the boat's heading, he backs down the boat to set the anchor. However, no anchor can provide its maximum hold except on ideal bottom conditions for its particular type. Backing down the boat without knowledge of the amount of pull exerted on the anchor may drag an anchor that otherwise would have held the boat safely for the expected wind and sea conditions. Dragging most anchors fouls their resetting design geometry which is difficult to correct, particularly under inclement weather conditions. Also, dragging an anchor by power, which anchor otherwise would not drag under actual or expected conditions, can prejudice a boat owner against enjoyable anchorage locations. On the other hand, not setting an anchor to hold what it will be required to hold under subsequent weather conditions is a dangerous practice.

Apparatus made in accordance with this invention provides a direct and continuous indication of the pull being exerted on the anchor line so that the captain will know that the anchor is set to withstand the maximum estimated pull to be exerted on the anchor under conditions prevailing during the time the boat is to be anchored at a particular location.

SUMMARY OF THE INVENTION

A cleat, or bitt, is made in two portions which are rotatable relative to each other over a limited angular range, the extent of such rotation being determined by the pull exerted on the cleat by an anchor line connected thereto. Built into the cleat is a transducer comprising a resistance mechanism connected to a d.c. voltage source and providing an output voltage which varies in magnitude in correspondence with the relative rotation of the two portions of the cleat. The resistance mechanism is arranged and constructed to provide an output voltage of constant polarity regardless of the direction of the relative rotation of the two portions of the cleat. The output voltage of the transducer energizes an electrical instrument having a scale calibrated directly in pounds anchor pull.

An object of this invention is the provision of load measuring apparatus particularly adapted for indicating the pull exerted on a boat anchor line.

An object of this invention is the provision of a cleat constructed as a mechanical force to electrical voltage transducer, which transducer actuates an electrical instrument having a scale calibrated in values indicating the pull exerted on the cleat by a line attached thereto.

An object of this invention is the provision of apparatus for indicating the tension applied to a line that is connected between an anchor and a cleat which is secured to a boat.

An object of this invention is the provision of a transducer for actuating an electrical instrument, which transducer comprises two members forming a housing and arranged for angular rotation relative to each other, and a resistance mechanism in the housing and adapted to provide an output voltage in correspondence with the said angular rotation.

An object of this invention is the provision of a mechanical force to voltage transducer comprising two members arranged for angular rotation relative to each other about a common axis and in which such rotation is opposed by elastically compressible means.

The above stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
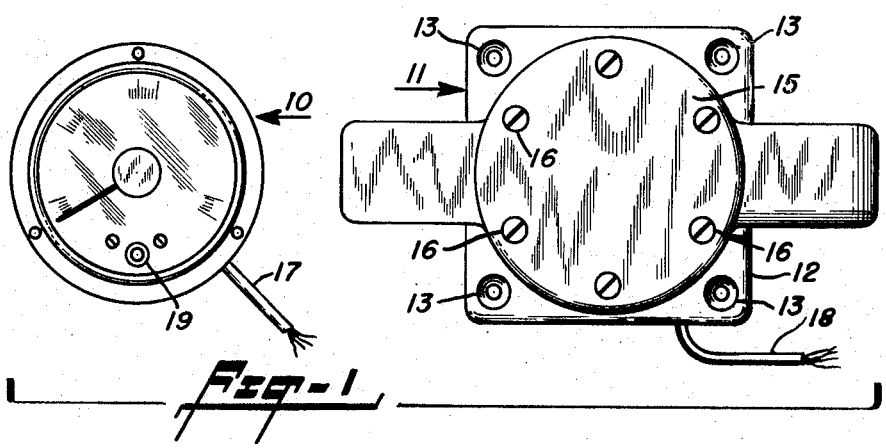
FIG. 1 is a top plan view of the transducer and indicating instrument forming apparatus made in accordance with this invention.
Figure 2:
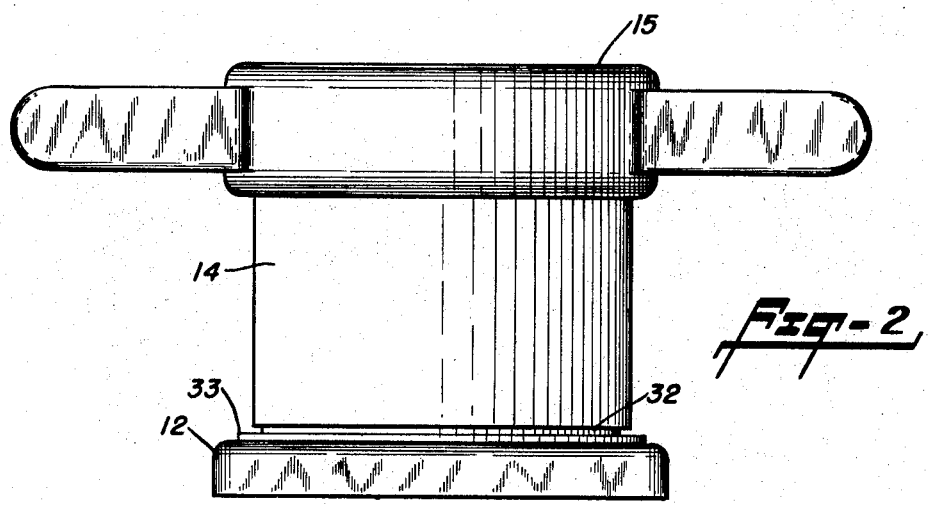
FIG. 2 is a side elevational view of the transducer.

Referring to FIGS. 1 and 2, there is shown an electrical indicating instrument 10, having a scale calibrated in pounds anchor pull, and a cleat 11 which houses the transducer. One portion of the cleat comprises a base 12 provided with mounting holes 13 for bolting the cleat to a surface on a boat. The other portion of the cleat comprises a barrel 14 to which the cap 15 is secured by means of a plurality of screws 16. Multiconductor cables 17 and 18, extending respectively from the instrument and the transducer, serve to connect these members into the electrical circuit, as will be described hereinbelow. The instrument is provided with a push/push switch 19 which is illuminated by a self-contained light emitting diode, thereby to indicate when the instrument is connected to the circuit.

Figure 3:
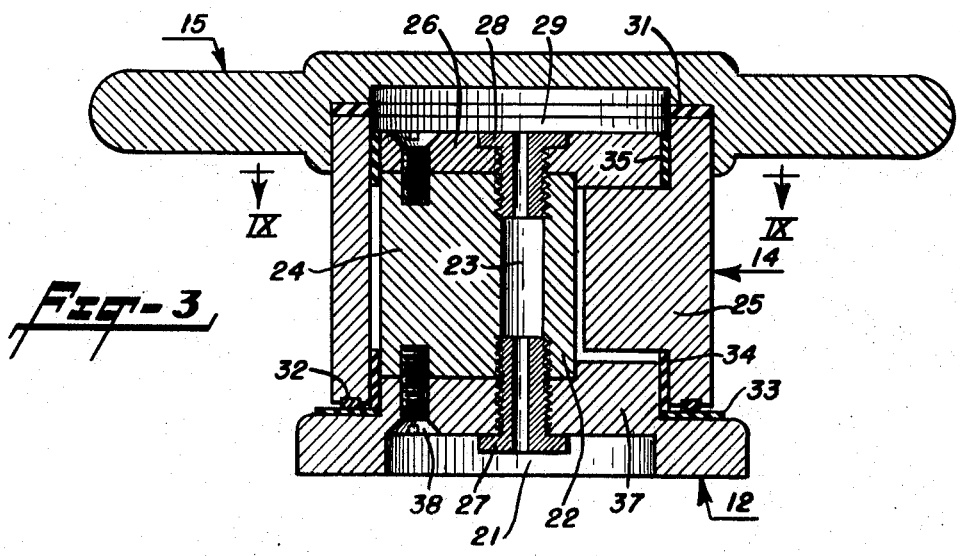
FIG. 3 is a vertical, central, cross-sectional view taken through the transducer, with the resistance mechanism omitted.

Referring now to FIGS. 2 and 3, the transducer base 12 is provided with a central bore 21 and has secured thereto a core 22 having a central hole 23 extending therethrough. The core 22 includes three, integral, radially-extending webs which are positioned between three similar webs formed integrally with the barrel 14, only the core web 24 and barrel web 25, being visible in this particular view. A circular top 26 is secured to the upper end of the core 22. Screws 27 and 28 are threaded into the threaded ends of core hole 23, said screws being hollow. Lead wires, not shown, pass through these screws and are connected to the resistance mechanism of the transducer. This mechanism is not shown in FIG. 2, but it is disposed in the space identified by the numeral 29. An oil treated waterproof fiber gasket 31 serves to provide a watertight joint between the cap 15 and the barrel 14, and the bottom end wall of the barrel is provided with a circular channel accommodating a nitrile rubber O-ring 32 which rides on a flat washer 33 made of Teflon. Disposed in the space between the barrel 14 and the integral boss on the base 12 is a vertically disposed Teflon washer 34, and a similar washer 35 is disposed between the barrel and the core top 26. The base 12, core 22 and core top 26 form a unitary structure which can be secured to a surface on a boat. The barrel 14 and cap 15 are rotatable about the core to a limited extent, as will be described in more detail hereinbelow. The O-ring 32 provides an effective seal against entrance of moisture into the transducer, while the Teflon washers 33, 34 and 35 provide bearing surfaces having a low, constant coefficient of friction.

Figure 6:
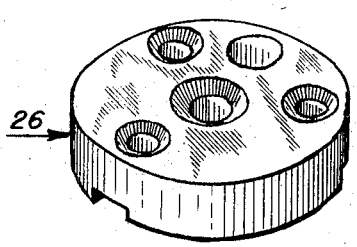
FIG. 6 is a similar view of the circular top adapted to be secured to the top of the core.
Figure 5:
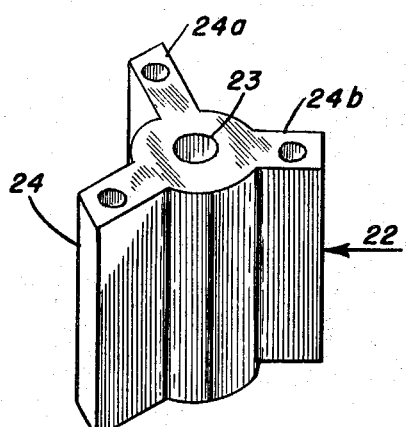
FIG. 5 is a similar view of the central core of the transducer.
Figure 4:
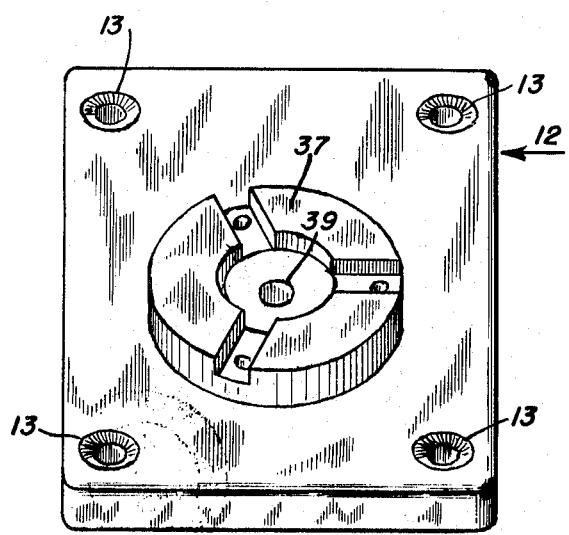
FIG. 4 is an isometric view of the transducer base.

Reference now is made to FIGS. 4–6, respectively, showing the boss 37 formed integrally with the base 12 and provided with three radial slots spaced 120° apart; the core 22 provided with three radial webs 24, 24a and 24b; and the core top 26 which also is provided with three radial slots. The lower end portions of the core webs fit snugly into the radial slots of the boss 37 (of the base) and these webs are secured to the boss by three screws which pass through clearance holes formed in base of the slots and which are threaded into threaded holes formed in the bottom surfaces of the core webs, one such screw 38 being visible in FIG. 3. The hollow screw 27, FIG. 3, passes through a clearance hole 39 formed in the boss 37, FIG. 4, and into the threaded lower end of the central hole 23 formed in the core, FIG. 5. The upper end portions of the core webs, FIG. 5, fit snugly into the radial slots formed in the core top 26, which top is secured to the core webs and to the core in the same manner as has been described with reference to the core and the base. However, the core top is not secured in position until after the barrel of the transducer has been positioned about the core.

Figure 7:
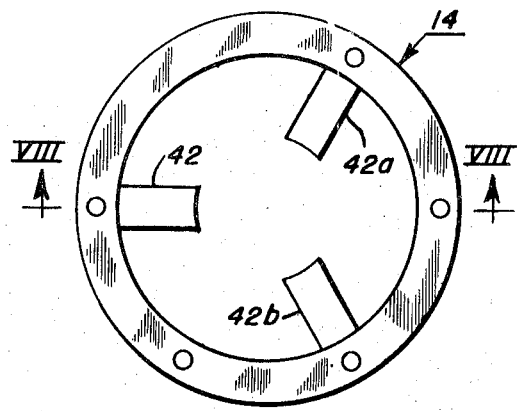
FIG. 7 is a top plan view of the transducer barrel.
Figure 8:
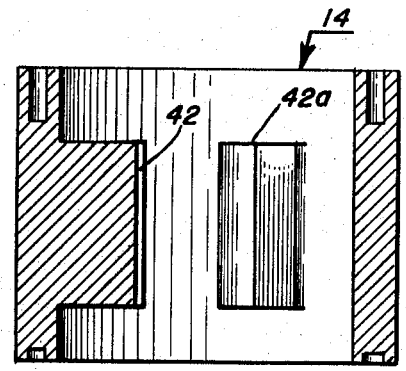
FIG. 8 is a cross-sectional view taken along the line VIII — VIII of FIG. 7.
Figure 9:
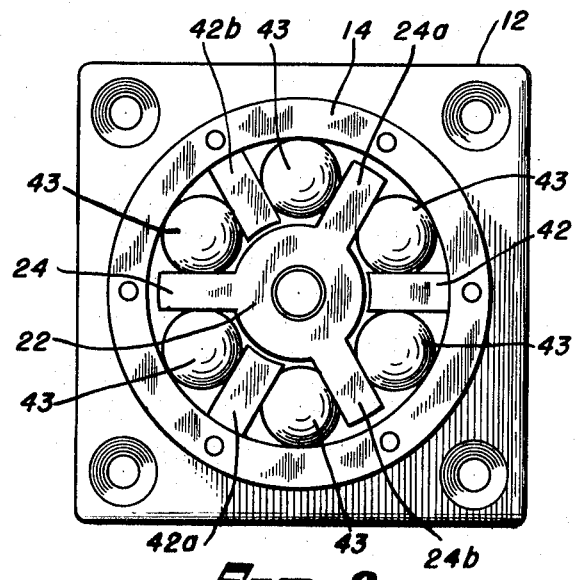
FIG. 9 is a horizontal, cross-sectional view taken along the line IX — IX of FIG. 3.
Figure 10:
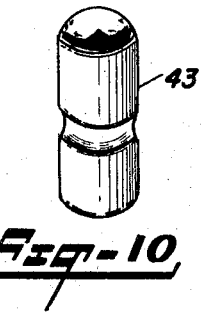
FIG. 10 is an isometric view of one of the compressible rods which oppose relative angular rotation between the transducer base and barrel.

FIGS. 7 and 8 show the barrel 14 having three, integral, radial webs 42, 42a and 42b. These webs have an axial length slightly shorter than that of the core webs. The barrel is positioned over the assembled core and base as shown in FIG. 9, to which reference now is made. It will be noted that the barrel webs 42, 42a and 42b are disposed between the core webs 24, 24a and 24b, that the ends of the core webs are spaced from the inner surface of the barrel, and that the ends of the barrel webs are spaced from the outer surface of the core. The webs of the barrel and the core are spaced apart by six, shaped rods 43 made of a urethane elastomer, see also FIG. 10. These rods have an hourglass shape and full radius ends to provide a desired compliance curve. The diameter of these rods is such that when all six are pressed between adjacent webs, they are squeezed from their normal round cross-section to conform to the somewhat keystone shaped space between adjacent webs. Urethane elastomer can be molded to a desired shape and compounded to a desired compression modulus, compression set, Bashore rebound percent and Durometer hardness. It also has excellent oil and solvent resistance and thermal stability. Its' remarkable ability to return to its original size and shape after extreme distortion makes it a solid which behaves like a liquid.

Figure 11:
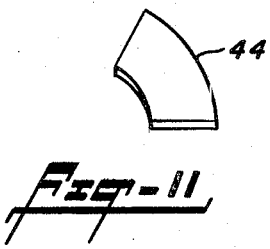
FIG. 11 is an isometric view of one of the plastic segments which are placed on top of the compressible rods.

Individual segment-shaped members 44, see FIG. 11, are placed on the boss of the base 12, after which the rods 43 are forced between adjacent webbs of the core and the barrel, FIG. 9. Similar segment-shaped members are then placed over each of the rods 43. The core top 26, FIG. 6, is then secured to the core as shown in FIG. 3, thereby compressing the rods, axially, between the core top and the base of the transducer. The segment shaped members 44, made of Teflon, isolate the end thrust friction of the barrel webs from the base and the core top. They also reduce the friction of the rods 43 as they expand lengthwise under radial compression. Referring specifically to FIGS. 3 and 9, it will be apparent that the six rods 43 comprise compressible means opposing relative angular rotation between the base 12 and the barrel 14 about a vertical axis passing through the center of the core 22. When the base is secured in fixed position on a boat and an anchor line is entwined around the barrel and secured to the cap 15, the barrel will rotate in one or the other direction within a limited range. The actual angular rotation of the barrel, which depends upon the pull of the anchor line, results in a compression of the rods 43 and, simultaneously, results in a change in the output voltage of the transducer.

Figure 12:
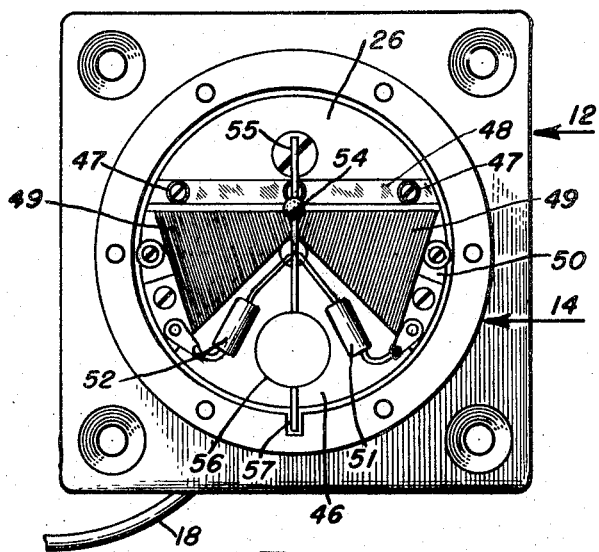
FIG. 12 is a top plan view of the transducer, with the cap removed.

The resistance mechanism of the transducer is shown in FIG. 12 which is a top plan view of the transducer with the cap removed therefrom. The fixed components of the resistance mechanism are mounted on an insulator plate 46 which is secured to the core top by small screws. Certain of these screws, identified by the numerals 47, also serve to secure a silver alloy rail 48 to the insulator plate. Conventional insulating washers and tubes are associated with each of these screws, thereby to electrically insulate the rail from the core top. An insulated wire winding 49 is wound about a form 50, which form is secured to the insulator plate and has a straight edge parallel to and spaced from the bar 48. The opposite edge of this form diverges outwardly from the center line, whereby the individual convolutions of the wire winding vary from a minimum length at the center line to a maximum length at each side edge of the form. A pair of fixed resistors 51 and 52 are connected to the ends of the winding and to individual leads of the multi-conductor cable 18, which cable passes through the aligned central holes formed in core top, the core and the base. The insulation is removed from the wire turns at points where the turns pass around the straight edge of the supporting form, that is, bare portions of the wire turns are presented to the rail 48. Electrical contact is made between the rail and the bare wire turns by a silver alloy ball 54 which is free to rotate about and slide back and forth on a stainless steel slide rod 55 having an end forcefitted into a diametric hole provided in the Teflon plug 56. A stainless steel link rod 57 has one end slidable in a second diametric hole formed in the plug, while the other end of the link rod is offset at a right angle and enters into a hole formed in the rim of the barrel 14.

Figure 13:
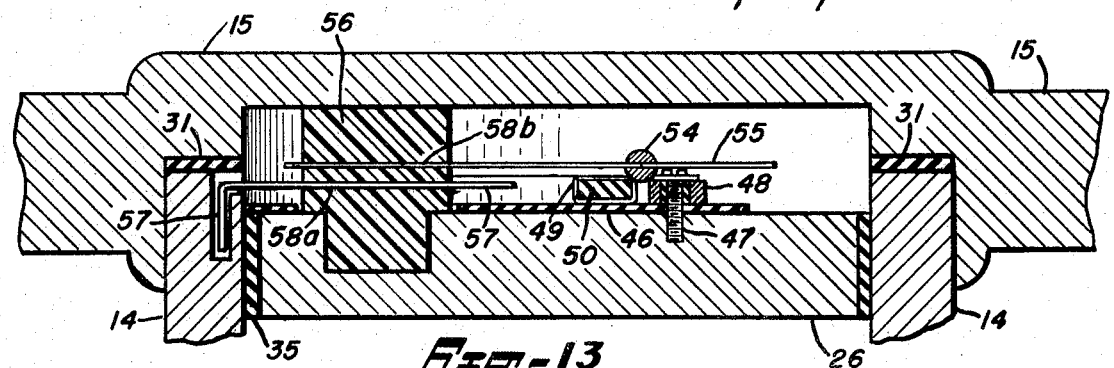
FIG. 13 is an enlarged, vertical, cross-sectional view taken through the axis of the rotatable arm of the transducer.

A better understanding of the resistance mechanism will be had by reference to FIG. 13 which is an enlarged, cross-sectional view taken along a vertical plane containing the two rods 55 and 57. With the transducer cap 15 secured to the barrel 14, the gasket 31 and the drive end of the link rod 57 are firmly contained therebetween. The other end of the link rod 57 is free to slide in the diametric hole 58a formed in the circular Teflon plug 56. The lower portion of this plug passes through a circular clearance hole formed in the insulator mounting plate 46 and the reduced diameter portion of the plug is rotatable in the circular bore formed in the core top 26. The alloy ball 54 is rotatable about and slidable along the slide rod 55, which rod is bent downward toward the rail 48 to provide a downward contact pressure of the ball on the edge of the rail and the bare portion of the wire 49 wound on the supporting form 50. The end of the slide rod is force-fitted into the diametric hole 58b of the plug 56, whereby rotation of the plug about its axis results in a rotation of the ball about the slide rod while maintaining a bridging electrical contact between the rail 48 and the bare portions of the wire turns. Referring back to FIG. 12, it will be apparent that upon angular movement of the slide rod 55, the ball 54 rotates along a straight line which is the chord of a circle having its center coinciding with the rotational axis of the plug 56. This rotary movement of the ball about the slide rod, together with the sliding movement of the ball along the slide rod as the plug rotates the slide rod toward an end of the wire winding, produces multi-track, wiping contact surfaces on the ball, thereby promoting a long, trouble-free operating life.

With continued reference to FIG. 12, the insulator mounting plate 46 is secured to the core top which, in turn, is secured to the base 12. Thus, the wire winding 49 is secured in fixed position relative to the base. Consequently, rotation of the barrel 14 in one or the other direction relative to the base results in a corresponding rotation of the plug 56 about its axis. Since the rotational axis of the plug is not the same as that of the barrel, the end of the link rod 57 must be slidable within the diametrica hole formed in the plug. Specifically, when the barrel is rotated in a clockwise direction, the link rod causes the plug to rotate in the same direction and the link rod tends to withdraw from the hole in the plug. At no time, however, does the link rod withdraw completely from the hole, throughout the maximum range of angular rotation of the barrel. When the barrel returns to its original position, the ball 54 is returned to the center turn of the wire winding. Movement of the ball along the rail 48 and winding 49, in correspondence with rotation of the barrel in one or the other direction, results in a change in ohmic resistance between the rail and the center turn of the winding.

Figure 14:
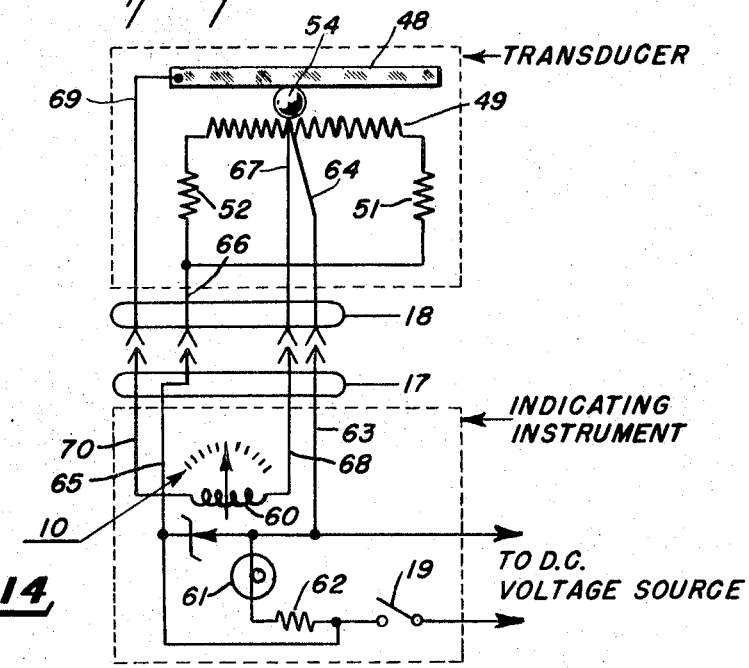
FIG. 14 is a circuit diagram of the apparatus.

The change in resistance between the center turn of the wire winding and the rail produces a corresponding change in the voltage output of the transducer as will be seen by reference to the circuit diagram of FIG. 14. The transducer and the electrical indicating instrument are electrically connected by means of a conventional, multi-contact socket and plug connected to the leads of the cables 17 and 18. The center turn of the wire winding 49 is connected to the movable coil 60 of the instrument and to one side of a d.c. voltage source. The other end of the movable coil is connected to the rail 48, and both ends of the winding are connected to the other side of the voltage source through the fixed resistors 51 and 52. These resistors have equal ohmic values as do the two portions of the winding as measured from the center turn to the end turn. Upon closure of the push button switch 19 (see also FIG. 1), the light emitting diode 61 is connected across the voltage source through the fixed resistor 62. The diode is incorporated in the switch provided with a lens, thereby to indicate connection of the circuit to the voltage source. With the switch 19 closed, the voltage is applied across the center turn of the winding (leads 63 and 64) and both ends of the winding (leads 65 and 66). The voltage drop between the center turn of the winding and each end thereof is the same and, consequently, the voltage across the movable coil 60 is zero. However, when the ball 54 is displaced, say, to the left, it connects the bar 48 to a winding turn lying between the center turn and the winding end. Under this condition, the voltage drop appearing across the center winding turn and the turn engaged by the ball is applied across the coil 60 through the leads 67, 68 and 69, 70. The polarity of the voltage applied to the coil 60 is the same when the ball is displaced either to the left or to the right of center winding turn. The configuration of the wire winding is such that each turn has a length longer than that of the adjacent turn, taken from the center turn of the winding toward each end thereof. Thus, as the ball moves into engagement with the progressively longer individual turns, the ohmic resistance change between the ball and the center turn follows a predetermined curve and, obviously, the voltage applied to the coil 60 follows a similar curve. The relationship between the pull exerted on the transducer barrel and the angular rotation of the barrel also is a curve which depends upon the compression characteristics of the six rods 43 shown in FIG. 9. The output voltage curve of the resistance mechanism is so choosen that it compliments the pull vs rotation curve of the transducer barrel, thereby to provide a substantially linear relationship between the pull exerted on the barrel and the voltage applied to the instrument movable coil. This results in a substantially uniformly calibrated instrument scale, as shown in FIG. 1.

The described apparatus provides a direct measurement of the pull exerted on an anchor line regardless of the horizontal direction the line comes from to the bitt or cleat. In addition, since the transducer barrel is rotatable in either direction, the apparatus provides for the measurement, successively, on each of two anchor lines to the left and right as the boat swings between each of two anchors.

Although the invention has been described with specific reference to a deck mounted bitt, or cleat, it is adapted for many uses wherein a continuous indication, or measurement, of a tension is desired as, for example, a vertical capstan on a windlass or a self-tailing sheet winch.

Having now described the invention what I desire to protect by letters patent is set forth in the following claims.

1. Apparatus comprising,
   a — a core member secured to a base,
   b — a cylindrical barrel,
   c — means mounting the barrel for rotation about the axis of the core member,
   d — elastically-deformable means opposing rotation of the barrel relative to the core member,
   e — a multi-turn winding disposed within said barrel,
   f — movable contact means establishing electrical contact with turns of said winding,
   g — drive means imparting movement to the said movable contact means in correspondence with rotation of the said barrel,
   h — an electrical instrument having a movable coil,
   i — a source of d.c. voltage connected across the center turn of said winding and both ends of the winding, and
   j — circuit elements connecting the said movable coil across the center turn of the winding and the said movable contact means.

2. The invention as recited in claim 1, wherein the said barrel has inwardly-directed, spaced radial webs, wherein the said core member has outwardly-directed, spaced webs positioned between the webs of the barrel, and wherein the said elastically-deformable means is in the form of rods, each rod being positioned between adjacently-disposed webs of the barrel and the core member.

3. The invention as recited in claim 2, wherein the turns of said winding have portions substantially equally spaced from a contact bar, wherein the said movable contact means is a metal ball rotatable about and slidable along a slide rod, said ball being in electrical contact with the said contact bar and the turns of said winding, wherein an end of said slide rod is secured to a disc mounted for rotation about its axis, and wherein the said disc is mechanically-coupled to said barrel; the said slide rod and the said disc constituting the said drive means.

4. The invention as recited in claim 3, wherein the said disc is mechanically-coupled to the barrel by a link rod having one end portion slidably received in a hole formed in said disc and the other end portion inserted into a hole formed in the rim of said barrel.

5. The invention as recited in claim 4, including a cap secured to an end of said barrel and having diametrically-opposed arms extending therefrom, wherein the said cap, barrel and base form a bitt, and wherein the said instrument has a scale calibrated in factors indicative of the pounds pull of an anchor line secured to the bitt.

* * * * *